Patented Aug. 4, 1936

2,050,212

UNITED STATES PATENT OFFICE 2,050,212

PROCESS FOR PRODUCING A GARNET ABRASIVE

Royal H. Rizor, Detroit, Mich., assignor, by mesne assignments, to Mid-West Abrasive Company, a corporation of Delaware No Drawing. Application April 22, 1935, Serial No. 17,722

9 Claims. (Cl. 51—278)

The invention relates to a process for obtaining a new garnet abrasive having improved surface properties rendering the same more useful for the manufacture of coated abrasives.

It is known that coated abrasives using garnet have a disadvantage when compared to certain other artificial and natural minerals in that there is more shedding of the grain under stress. The principal object of my invention is to eliminate this undesirable characteristic and produce an improved type of garnet while retaining the other desirable characteristics inherent in the garnet itself.

I have discovered that by a suitable chemical process I can change the chemical nature of the surface of garnet and thereby change the surface physical properties sufficiently to greatly reduce grain shedding. My process consists essentially of a treatment of garnet with such reagents and under such conditions as to eliminate as far as is practicable from the garnet surface all of the metals in the garnet except the alkaline earth metals. Garnet minerals usually contain such divalent metals as calcium, iron, magnesium and manganese, and in accordance with my process it is desirable to eliminate or lessen the amount of iron and manganese on the surface thereby increasing the relative ratio of the calcium and magnesium. One of the effects of this treatment is to increase the adhesive strength between the garnet grains and the associated adhesive. The reagents which I find most satisfactory for carrying out the treatment are the alkali halides and the preferable conditions for the reaction are at a temperature of 550° C. to 850° C. in the presence of oxygen. When the garnet is treated in this manner I have found that the surface properties are very materially changed and the garnet may be incorporated into a coated abrasive having much less tendency for grain shedding under stress.

A further feature of my invention resides in the selection of the reagents and the operating conditions in order that the greatest improvement in the garnet grain may be obtained in the most expeditious and economical manner. Therefore I preferably carry out the improved process at a temperature within the range bounded on the high side by the melting point of the halogen salt used and on the low side by the melting point of the decomposition products resulting from the reaction. This temperature range is such that it would normally produce glazing but when used with a carefully regulated amount of oxygen as an additional reagent, these liquid decomposition products do not glaze but volatilize thereby removing them from the sphere of action. This permits a fast rate of reaction which proceeds until the halogen salt is exhausted. One of the advantages of the use of this temperature range in the presence of halogen salt and oxygen is that after the completion of the reaction no bodies of any sort remain except the garnet of new surface charactersitics and it becomes only necessary to cool in such a fashion as to retain these characteristics when cold. This can readily be accomplished by cooling in the absence of air.

The specific temperature within the temperature range is selected with regard to the particular halogen salt used. In general it is preferable to select a temperature as safely close as possible to the melting point of the halogen salt because of the increased rate at which the reaction occurs. Thus the temperature range is from 5° C. below the melting point of the halogen salt to 200° C. below the melting point. A practically useful temperature such as 50° C. below the melting point is ordinarily used because with the usual temperature controls this temperature obviates any danger of temperature fluctuations exceeding the melting point of the halogen salt reagent.

The reagents used in my process may be a simple halogen salt or mixtures of halogen salts, but it is preferred to use eutectic mixtures of halides since it has been found that the best results are thereby obtained. In pure or eutectic mixtures of salts the vapor generated is of constant composition. The vapor pressure is at a maximum at the melting point of the eutectic mixture or simple salt used. Apparently the reason for the greater activity of the eutectic mixtures lies in the fact that their reaction with the garnet produces still more complex and reactive products than are produced by the use of simple halogen salts. As a result, oxygen combines with and volatilizes these products at a much more rapid rate, thus permitting the entire reaction to occur at a higher rate of speed. The halides of silicon, aluminum, oxidized iron and oxidized manganese are volatile under the conditions of my process, and oxidized alkali metals are also volatile. The reaction thus proceeds until the supply of the halogen salts is exhausted.

Examples of reagents which may be advantageously used in my process are first a eutectic mixture containing one part sodium or potassium fluoride and two parts sodium chloride. The melting point of this eutectic mixture is about 700° C. When using 5% of this mixture based on the weight of garnet grain the process can be carried out at a temperature of 650° C. for one-half hour at heat, at the end of which time a satisfactory product is obtained. Where simple salts alone are used instead of eutectic mixtures, a higher temperature and a longer time is required. The highest melting halide, sodium fluoride, melts at slightly over 900° C., and if this material is used it is necessary to maintain the temperature at the high end of the temperature range or approximately 850° C. If potassium fluoride (melting point 860° C.) or sodium chloride (melting point 805° C.) are used alone, the reaction temperature may be maintained at a correspondingly lower value. Other halides and mixtures of halides may be used, and in general the more complex, lower melting eutectic mixtures can be used effectively at a lower temperature and with less heating time than the simple salts alone.

The amount of alkali halide or mixtures thereof used in the process is based on the weight of the garnet treated. I have found that 5% alkali halide is a useful proportion but greater or less amounts of the reagent can also be used ranging from relatively small amounts to as high as 10%. Ordinarily it would be preferable to use not less than 2½% with simple salts and eutectic mixtures. This amount ranges downwardly as the complexity of the halogen eutectics is increased due to the increasing reactivity produced by increasing complexity. However the degree of change may be varied by varying the amount and the nature of the reagent, commercial considerations of the value of the product and the cost of producing it being factors in determining the exact amount to be used.

As a specific example of my process, the following procedure may be used. Garnet is mixed with 5% of a powdered eutectic mixture of one part potassium fluoride and two parts sodium chloride. The material is then heated to a temperature of 650° C. in such a manner that oxygen can penetrate into the mass and no glazing will result. After maintaining the garnet at this temperature for one-half hour it is covered to prevent further contact with the oxygen and allowed to cool in the absence of air and moisture.

The garnet grain resulting from the above process has greatly improved surface properties rendering the same more useful for the manufacture of coated abrasives. The surface is not entirely freed from the metals manganese and iron but it is sufficiently changed chemically so that the new surface possesses the attributes of wetting well and forming a good union with the liquid adhesives used in the manufacture of coated abrasives. The physical appearance of the garnet after treatment by my process is darker than the untreated garnet which is due in part to the formation of higher oxides of manganese.

While the process as outlined above is adapted for the treatment of garnet, it is also to be understood that in the broader phases of the invention the method may be applied also to such analogous materials as are similar in general properties to garnet whether these materials be obtained from natural sources or are artificially synthesized.

While in the above description I have referred to the new garnet abrasive obtained by my process, this forms the subject matter of my co-pending application, Serial No. 89,164, filed July 6, 1936 in which the new garnet abrasive is described and claimed.

What I claim as my invention is:

1. The process of producing a garnet abrasive comprising treating garnet grain with alkali halide in the presence of oxygen at a temperature from just below the melting point of said halide to 200° C. below for a time sufficient to eliminate alkali halide from the resulting product.

2. The process of producing a garnet abrasive comprising treating garnet grain with alkali halide in the presence of oxygen at a temperature from just below the melting point of said halide to 50° C. below for a time sufficient to eliminate alkali halide from the resulting product.

3. The process of producing a garnet abrasive comprising treating garnet grain with a eutectic mixture of alkali halides in the presence of oxygen at a temperature from just below the melting point of said eutectic mixture to 200° C. below for a time sufficient to eliminate alkali halides from the resulting product.

4. The process of producing a garnet abrasive comprising treating garnet grain with alkali halide in the presence of oxygen at a temperature from just below the melting point of said halide to 200° C. below for a time sufficient to eliminate alkali halide from the resulting product and cooling in the absence of air and moisture.

5. The process of producing a garnet abrasive comprising treating garnet grain with an alkali halide in the presence of oxygen at a temperature of from 550° C. to 850° C. and cooling in the absence of air.

6. The process of producing a garnet abrasive comprising treating garnet grain with a mixture of two or more alkali halides in the presence of oxygen at a temperature between 550° C. and 850° C.

7. The process of producing a garnet abrasive comprising treating garnet grain with a eutectic mixture of alkali halides in the presence of oxygen at a temperature of from 550° C. to 850° C. and cooling in the absence of air.

8. The process of producing a garnet abrasive comprising heating garnet grain with alkali halide at a temperature above the normal glazing point and below the melting point of said halide and introducing a controlled amount of oxygen to prevent glazing and to cause a chemical modification of the garnet surface and continuing said heating until the alkali halide is eliminated from the resulting product.

9. The process of producing a garnet abrasive comprising treating garnet grain with a eutectic mixture of two parts sodium chloride and one part sodium fluoride at 650° C. in the presence of oxygen for about thirty minutes at heat thereby changing the surface characteristics of the grain.

ROYAL H. RIZOR.